UNITED STATES PATENT OFFICE.

ABBOT R. DAVIS, OF EAST CAMBRIDGE, MASSACHUSETTS.

IMPROVEMENT IN PRESERVING EGGS.

Specification forming part of Letters Patent No. 131,507, dated September 24, 1872.

*To all whom it may concern:*

Be it known that I, ABBOT R. DAVIS, of East Cambridge, in the county of Middlesex and State of Massachusetts, have invented a new Method of Preserving Eggs; and I hereby declare that the following is a full, clear, and exact description thereof.

Eggs have been desiccated as in the patents to C. A. Lamont, October 10, 1865, and November 28, 1865, and to Thos. H. Quick, November 21, 1865, in which they were reduced to a dry powder, difficult of solution; but my invention consists in condensing eggs by evaporating to a semi-liquid mass after removing them from the shells, the degree of heat employed being so low as not to prevent them from being afterward dissolved when required for use, and in adding sugar and other substances hereinafter described.

To enable others skilled in the art to understand and use my invention, I will proceed to describe the manner in which I have carried it out.

The yolks and whites of the eggs are first taken out of the shells and thoroughly beaten or mixed together, after which they are condensed either by evaporating in vacuum or by spreading in very thin layers upon a suitable surface, the degree of heat employed in either case being so low as not to cook the eggs or prevent them from being afterward dissolved. After being condensed to about the consistency of thick molasses a small quantity of sugar and salt is added, in the proportion of about one and one-half ($1\frac{1}{2}$) ounce of of sugar and one-third ($\frac{1}{3}$) ounce of salt to each dozen of eggs. Instead of using both sugar and salt either may be used alone, in the proportion of about two (2) ounces of the former or one (1) ounce of the latter to each dozen of eggs. About one-tenth ($\frac{1}{10}$) ounce of sulphite of soda is also added to each dozen of eggs, and the whole mass thoroughly mixed together. The sulphite of soda effectually arrests decomposition and avoids the necessity of using an excessive quantity of sugar or salt to preserve the eggs as would otherwise be required, and which would render them unfit for most purposes. The sugar, salt, and sulphite of soda can be mixed with the eggs, if preferred, before they are beaten up and condensed.

The sugar, salt, and sulphite of soda have a very important effect in the preservation of the eggs, as they prevent fermentation and decomposition from taking place while the eggs are undergoing evaporation, as would otherwise be the case unless a degree of heat was used that would cook the egg instead of evaporating a portion of it; and, besides this, the substances named render the semi-liquid mass more easily soluble, because they have great affinity for water and will readily take it up, which the egg itself will not do.

Eggs treated as above described will keep for a great length of time without becoming spoiled, and can be put up in bottles or other convenient receptacles, which need not be hermetically sealed.

When required for use the eggs so prepared must be dissolved in milk or water and brought to the required consistency.

For many purposes the whites of eggs alone are used, and to supply this demand the whites may be separated from the yolks and condensed as above described and pulverized, if desired.

My improved method of preserving eggs enables me to put up large quantities at the most favorable times, and in places where they can be procured at the lowest prices; consequently, they can be sold at all seasons of the year at a moderate price.

Eggs, when condensed as above described, occupy very little space, and all liability of breakage in transportation incident to eggs in the shell is avoided.

Claims.

What I claim as my invention, and desire to secure by Letters Patent, is—

1. The within-described method of preserving eggs by evaporation or condensation, substantially as set forth.

2. As a new article of manufacture, preserved eggs in a thick semi-liquid state, when combined with the ingredients herein described.

Witness my hand this 29th day of August, A. D. 1872.

ABBOT R. DAVIS.

In presence of—
P. E. TESCHEMACHER,
W. J. CAMBRIDGE.